(12) United States Patent
Ghahremani et al.

(10) Patent No.: US 7,597,484 B2
(45) Date of Patent: Oct. 6, 2009

(54) MID MODULE AND A METHOD OF MOUNTING AN OPTICAL FIBRE IN AN MID MODULE

(75) Inventors: Cyrus Ghahremani, Regensburg (DE); Stefan Paulus, Zeitlarn (DE); Bernd Betz, Oberhinkofen (DE); Jochen Dangelmaier, Beratzhausen (DE); Rudolf Siegfried Lehner, Laaber (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/961,227

(22) Filed: Dec. 20, 2007

(65) Prior Publication Data

US 2008/0152285 A1 Jun. 26, 2008

(30) Foreign Application Priority Data

Dec. 22, 2006 (DE) .................. 10 2006 062 279

(51) Int. Cl.
*G02B 6/36* (2006.01)
(52) U.S. Cl. .......................................... 385/76; 384/55
(58) Field of Classification Search .................. 385/55, 385/69, 72, 76, 88, 92, 98, 99, 137
See application file for complete search history.

(56) References Cited

U.S. PATENT DOCUMENTS

| | | | | | |
|---|---|---|---|---|---|
| 3,537,064 | A | * | 10/1970 | Breslin ........................ | 439/550 |
| 3,989,339 | A | * | 11/1976 | Haitmanek .................. | 439/421 |
| 4,986,625 | A | * | 1/1991 | Yamada et al. ................ | 385/55 |
| 5,044,719 | A | * | 9/1991 | Nakamura .................... | 385/76 |
| 5,048,920 | A | * | 9/1991 | Newell ......................... | 385/55 |
| 5,121,455 | A | * | 6/1992 | Palecek ......................... | 385/69 |
| 5,296,072 | A | * | 3/1994 | Dannoux et al. ............. | 156/257 |
| 5,301,250 | A | * | 4/1994 | Cheng .......................... | 385/76 |
| 5,314,064 | A | * | 5/1994 | Wells et al. .................. | 206/340 |
| 5,426,715 | A | * | 6/1995 | Moisson et al. .............. | 385/76 |
| 5,452,386 | A | * | 9/1995 | van Woesik .................. | 385/72 |
| 5,590,230 | A | * | 12/1996 | Cheng .......................... | 385/77 |
| 5,592,289 | A | * | 1/1997 | Norris .......................... | 356/244 |
| 5,638,477 | A | * | 6/1997 | Patterson et al. ............. | 385/99 |
| 5,685,862 | A | * | 11/1997 | Mahurkar .................... | 604/194 |
| 5,742,719 | A | * | 4/1998 | Birnbaum .................... | 385/70 |
| 5,757,997 | A | * | 5/1998 | Birrell et al. ................. | 385/60 |
| 5,784,513 | A | * | 7/1998 | Kuribayashi et al. ......... | 385/88 |
| 5,802,230 | A | * | 9/1998 | Kuribayashi et al. ......... | 385/92 |

(Continued)

FOREIGN PATENT DOCUMENTS

DE 102 05 810 2/2002

(Continued)

*Primary Examiner*—Frank G Font
*Assistant Examiner*—Peter Radkowski

(57) ABSTRACT

An MID module with a plug-type connector for an optical fibre with an upper face, edge faces and a lower face, comprising an accommodating channel surrounded by walls for the accommodation of an optical fibre. Here the diameter of the accommodation channel essentially corresponds to that of the optical fibre. The MID module further comprises a semiconductor chip, which is arranged on a front face of the accommodating channel. The semiconductor chip comprises an optically active region, which is optically accessible from the accommodation channel. A slot is provided in the walls of the MID module for the accommodation of a locking element. A locking element, introducible into the slot, locks the fibre in the accommodating channel.

11 Claims, 5 Drawing Sheets

U.S. PATENT DOCUMENTS

| | | | | |
|---|---|---|---|---|
| 5,803,575 | A * | 9/1998 | Ansems et al. | 362/554 |
| 6,033,125 | A * | 3/2000 | Stillie et al. | 385/75 |
| 6,086,265 | A * | 7/2000 | Kuribayashi et al. | 385/92 |
| 6,431,763 | B1 * | 8/2002 | Sherman et al. | 385/81 |
| 6,485,191 | B1 * | 11/2002 | Sato | 385/73 |
| 7,066,656 | B2 * | 6/2006 | Demissy et al. | 385/55 |
| 7,140,787 | B2 * | 11/2006 | Yamauchi et al. | 385/98 |
| 7,272,292 | B2 * | 9/2007 | Yuuki | 385/137 |
| 2002/0094185 | A1 * | 7/2002 | Hopkin et al. | 385/137 |
| 2003/0152331 | A1 * | 8/2003 | Dair et al. | 385/59 |
| 2004/0051313 | A1 * | 3/2004 | Trouyet | 285/305 |
| 2005/0220418 | A1 * | 10/2005 | Demissy et al. | 385/55 |
| 2006/0193564 | A1 * | 8/2006 | Demissy et al. | 385/55 |
| 2007/0059972 | A1 * | 3/2007 | Rigollet et al. | 439/441 |

FOREIGN PATENT DOCUMENTS

| | | |
|---|---|---|
| DE | 103 40 413 | 9/2003 |
| DE | 103 54 243 | 11/2003 |
| JP | 09292549 A * | 11/1997 |

* cited by examiner

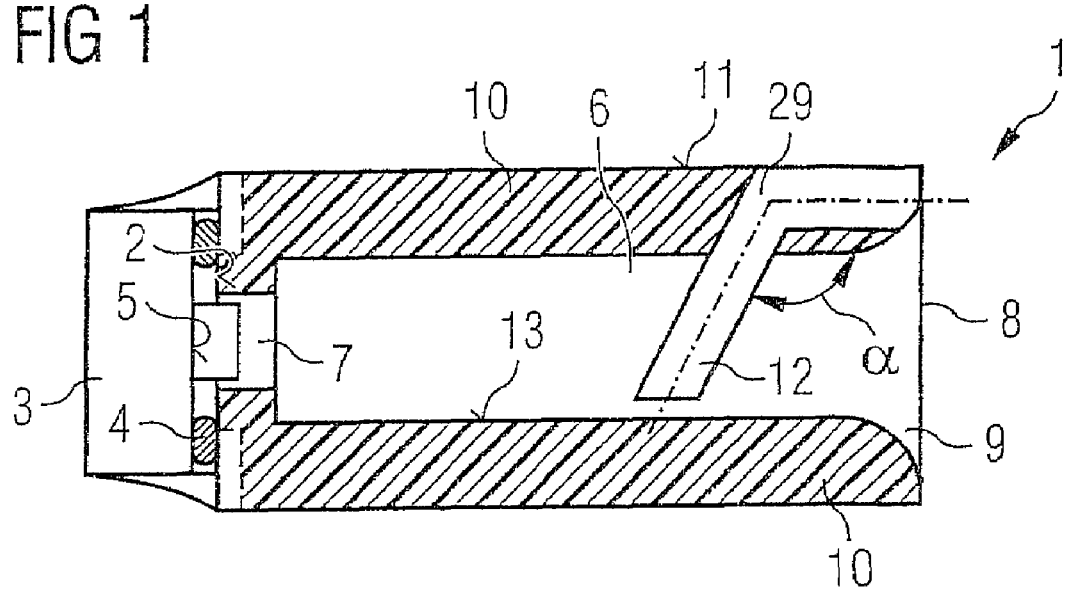
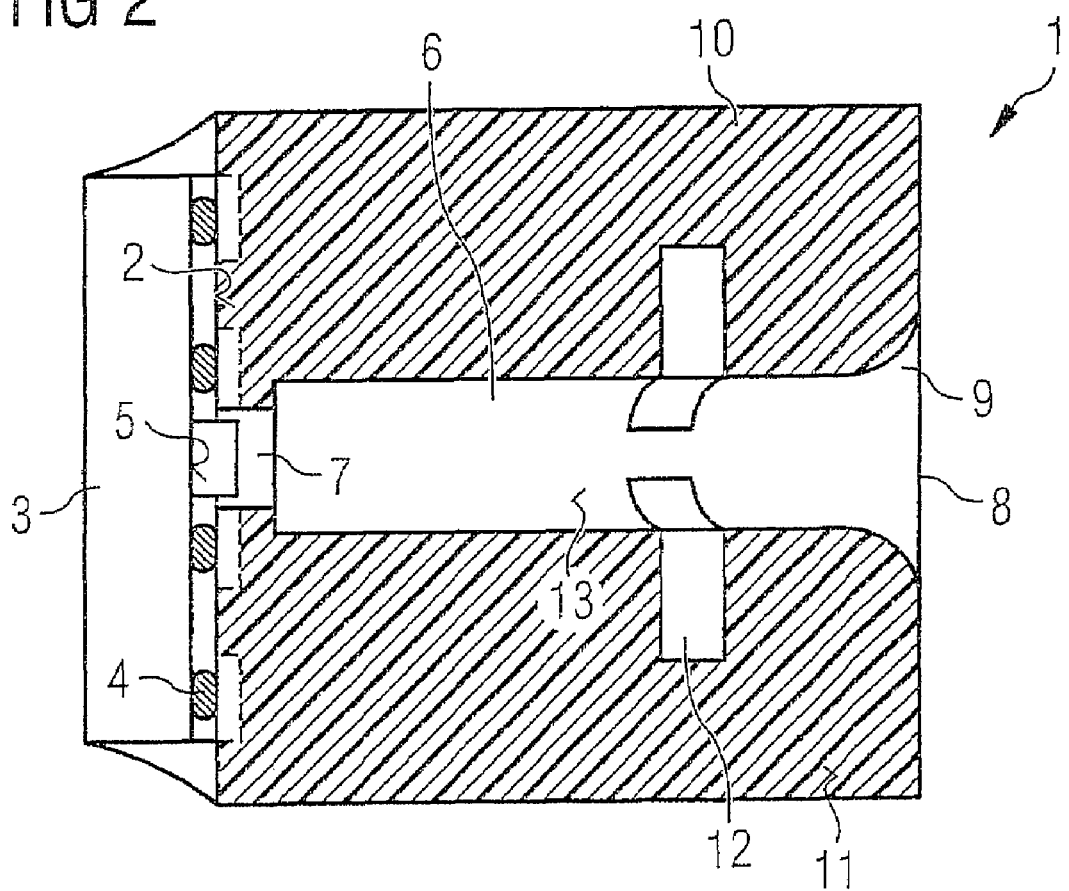

MID MODULE AND A METHOD OF MOUNTING AN OPTICAL FIBRE IN AN MID MODULE

CROSS-REFERENCE TO RELATED APPLICATIONS

This nonprovisional application claims priority to a German application having serial number 10 2006 062 279.0, filed on Dec. 22, 2006, entitled "AN MID MODULE AND A METHOD OF MOUNTING AN OPTICAL FIBRE IN AN MID MODULE", which is incorporated herein by reference in its entirety.

DESCRIPTION

The invention relates to an MID module (a "Moulded Interconnect Device" module) with an accommodating channel for an optical fibre and a semiconductor chip with an optically active region. It further relates to a method for the mounting of an optical fibre in the MID module.

The MID module can, for example, take the form of a part of an opto-coupler or another opto-electronic component, in which optical signals are converted into electrical signals, or vice versa. Here the semiconductor chip with its optically active region plays the role of a transmitter or receiver of an optical signal that is transferred via the fibre. The optically active region of the semiconductor chip can, for example, take the form of a photo-sensor, a photo-diode, or a light emitting diode (LED).

Such a module typically comprises a plug-in connection for connecting the optical fibre and the optically active region of the semiconductor chip. A so-called moulded interconnect device (MID) is suitable as a plug-in connector; this is a three-dimensional moulded part with an integrated wiring structure, in other words a three-dimensional, injection-moulded circuit carrier. The MID comprises an accommodating channel, into which the optical fibre is introduced and fixed.

In a first form of embodiment of the invention an MID module having an upper face, edge faces and a lower face comprises an accommodating channel surrounded by walls for the accommodation of an optical fibre. Here the diameter of the accommodating channel corresponds to that of the optical fibre.

The MID module further includes a semiconductor chip, which is arranged on a front face of the accommodating channel. The semiconductor chip comprises an optically active region, which is optically accessible from the accommodating channel. A slot is provided in the walls of the MID module to accommodate a locking element. A locking element introducible into the slot locks the fibre in the accommodating channel.

In the following exemplary embodiments of the invention are described in more detail by referring to the accompanying figures.

FIG. 1 shows schematically a side view of a cross-section through an MID module according to a first embodiment of the invention;

FIG. 2 shows schematically a top view of a cross-section through the MID module according to FIG. 1;

Same parts are provided with the same reference symbols in all figures.

Figure 3A:
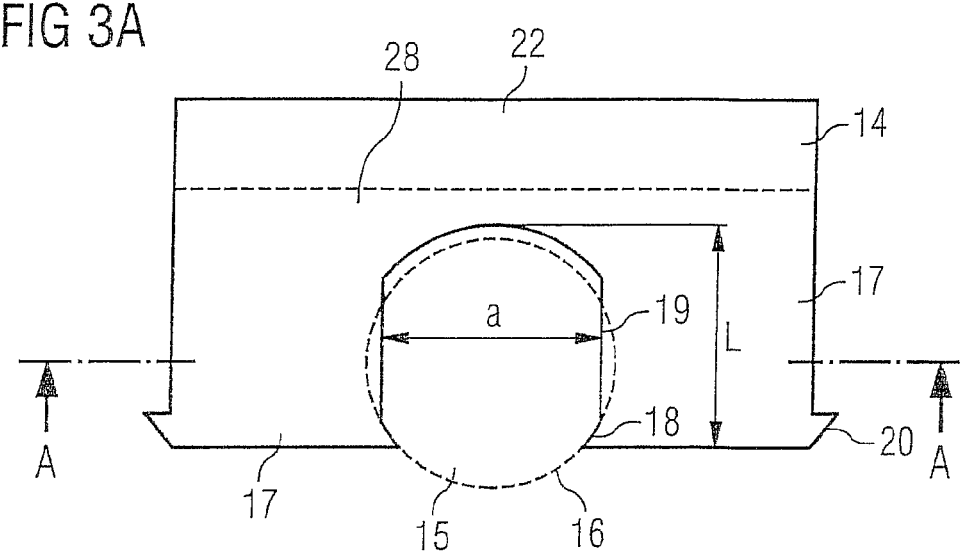
FIG. 3A shows schematically a locking element for the MID module according to the first embodiment.

The MID module 1 according to the first embodiment represented in FIG. 1 comprises on its front face 2 a semiconductor chip 3, which in this embodiment in flip-chip technology is soldered by solder balls 4 onto the front face 2. The semiconductor chip 3 comprises an optically active region 5, which is arranged behind a window 7 of the front face 2, which window is transparent in the range of the wavelengths transferred by the fibre. Here the optically active region 5 can take the form of a photo-sensor, a photo-diode, or also, for example, a light emitting diode.

The MID module furthermore comprises an accommodating channel 6, for an optical fibre or a fibre bundle, surrounded by walls 10. The fibre, not represented in the figure, has the function of transferring a light signal to or from the optically active region 5 of the semiconductor chip 3. Thus the semiconductor chip 3 serves as a transmitter or receiver for the light signal transported in the fibre.

By "fibre" is here and in the following to be understood both a single optical fibre and also a fibre bundle that can replace the individual fibre, depending on the bandwidth necessary for signal transfer.

The accommodating channel 6 is dimensioned such that its diameter corresponds as closely as possible to that of the bare fibre or bare fibre bundle. In this manner it is guaranteed that the MID module 1 can be designed to be as small and space saving as possible.

The optical access from the accommodating channel 6 to the optically active region 5 can be implemented either directly or indirectly, i.e. via an additional optical system. In the direct optical access case the optically active region 5 of the semiconductor chip is typically aligned to be parallel to the front face 2 of the accommodating channel 6.

For miniaturisation of the component the component height of the plug-in connection to connect the fibre 24 and the optically active region 5 of the semiconductor chip 3 is reduced, so that elements demanding a relatively large amount of space, such as e.g. ferrules, can be omitted.

Here the fibre 24 is locked in the accommodating channel 6. For this purpose a locking element 14 is provided, which is introduced into the slot 12, and holds the fibre 24 in a non-positive connection, in particular by clamping, while the locking element 14 itself is supported in the slot 12 and is connected with the MID module in a non-positive connection.

In one embodiment the slot 12 forms an angle α with the upper face of the MID module 1, wherein α>90° applies. The slot 12 thus runs obliquely and its lower end 5 advantageously lies nearer to the front face 2 of the accommodating channel 6 than its upper end.

When mounting the fibre is slid from the entry 8 of the MID module 1 into the accommodating channel 6. For particular ease of mounting the fibre, which is not secured in a ferrule, an introduction aid 9 is provided at the entry 8, which aid consists of an accommodating channel 6 diameter that is widened directly at entry 8 and rapidly reduces in size. By the introduction guide 9 the bare fibre can be introduced particularly simply in a centred manner into the accommodating channel 6.

With this MID module 1 it is possible to achieve very small distances between the fibre end and the optically active region 5 of the semiconductor chip 3. Such small distances are desirable, because otherwise with the relatively large aperture of the fibre the problem exists of illuminating the receiver surface with the light exit cone with a sufficient light intensity. This would have to be compensated for with an expensive optical system or with a large receiver surface. Small distances between the fibre end and transmitter or receiver moreover have the advantage that the residual intermediate space can simply be sealed and/or provided with a matching fluid to align the refraction indices, so that even with extreme temperature changes any build-up of moisture on the fibre ends is avoided, or does not play any role due to the small distance.

In order to ensure a particularly small distance between the end of the fibre and the optically active region 5 of the semiconductor chip 3, in other words to press the fibre as far as possible against the front face 2 of the MID module or the window 7, and at the same time to lock the fibre in the accommodating channel 6, the slot 12 is provided to accommodate the locking element 14.

The slot 12 extends through the wall 10 on the upper face 11 of the MID module 1, down to, or almost down to, the channel floor 13. The slot 12 forms an angle α with the upper face 11 of the MID module 1, which is greater than 90 degrees, for example 100 degrees. By sliding the locking element into the slot 12 the fibre is pressed against the front face 2.

FIG. 2 shows a top view onto a cross-section through the MID module 1 according to this first embodiment. In this view it can be seen that the slot 12 extends almost down to the channel floor 6.

FIG. 3A shows an example of embodiment in which the locking element 14 comprises two arms 17 that enclose the opening 15 to accommodate the fibre 24. The locking element 14 in this embodiment therefore has an approximate U-shape, wherein the opening 15 enclosed by the arms 17 of the U corresponds in its shape and in its diameter to the fibre cross-section. In FIG. 3A the cross-section of the fibre is indicated by the dashed line 16.

Since the fibre has to be securely locked and pressed against the front face 2 of the accommodating channel 6, it must be securely enclosed by the arms 17. In the example of embodiment shown this is ensured in that the lateral distance "a" between the two arms 17 is somewhat smaller than the diameter of the fibre. In addition the edges of the arms 17 facing the fibre are designed as cutting edges 19.

Since the bare fibre 24 that is clamped in the locking element 14 typically consists of mineral glass or plastic, the cutting edges 19 can dig into the fibre 24. Here, however, they only dig into the outermost regions of the sheath, not into the core of the fibre. In this manner it is ensured that the fibre 24 is not damaged, i.e. its waveguide properties are not modified or destroyed by the locking.

In the embodiment shown the locking element 14 consists essentially of plastic and includes a cross-link 28 with a bracket 22, by which the locking element 14, for ease of introduction into or removal from the slot 12, can, for example, be grasped with a tool, and two arms 17, which enclose an opening 15. Here the cross-link 28 links the two arms 17 together.

The bracket 22 forms an angle α with the arms and, in the installed state of the locking element 14, is aligned parallel to the upper face 11 of the MID module 1 or lies without constraint on or at the upper face 11.

In the mounting of the fibre 24 the latter is firstly slid into the accommodating channel 6, and pressed in the direction of the front face 2 of the MID module. Next the locking element 14 is slid into the slot 12 and pressed downwards in the direction of the channel floor 13. Here the cutting edges 19 of the locking element dig slightly into the sheath of the fibre and hook themselves in this manner into the latter. By means of the oblique orientation of the slot 12, which does not run at right angles to the upper face 11 of the MID module 1, the fibre is pushed forward in the direction of the front face 2, so that a minimum distance between the fibre end and the optically active region 5 of the semiconductor chip 3 is guaranteed.

The fibre can in addition be locked by engaging hooks 18 of the locking element 14, wherein in the installation of the locking element 14 the engaging hooks engage between the fibre 24 and the floor 13 of the accommodating channel 6. The engaging hooks 18 effect a particularly resilient connection between the locking element 14 and the fibre 24, and in particular prevent the locking element 14 from being inadvertently pulled out of the slot 12 and the fibre 24 thus being released. The engaging hooks 18 thus withstand a certain tensile load on the locking element 14 in the direction of the slot 12. They release the fibre 24 only in the event of a relatively large tensile force in the direction of the slot 12, so that the locking of the fibre 24 can be released when necessary, but cannot take place inadvertently.

For a non-positive connection between the locking element 14 and the fibre the engaging hooks 18 in one embodiment also have cutting edges that dig into the fibre 24.

The slot 12 is shaped such that the locking element 14 is essentially matched to it exactly. The slot 12 therefore consists in the region 29 above the accommodating channel 6 of a depression in the form of a cavity, in which the cross-link 28 is located in the installed state of the locking element, and in regions at the side of the accommodating channel it consists of two cavities, laterally adjacent to the accommodation channel 6 and merging into the latter, to accommodate the two arms 17.

The length l of the arms 17 and thus also the height of the opening 15 is smaller than or equal to the diameter of the fibre, but preferably is also larger than half the diameter of the fibre. In this manner is ensured at the same time both a relatively simple introduction of the locking element and a secure retention of the fibre without any damage to the same.

The locking element 14 further comprises external hooks 20 for a non-positive connection with the MID module 1, with which hooks it is locked in the MID module 1, so that no easy extraction of the locking element 14 is possible. The external hooks 20 act together with stops 23 in the walls. As the locking element 14 is slid into the slot 12 the external hooks 20 slide past the stops 23, engage behind the latter, and render any extraction difficult.

Figure 3B:
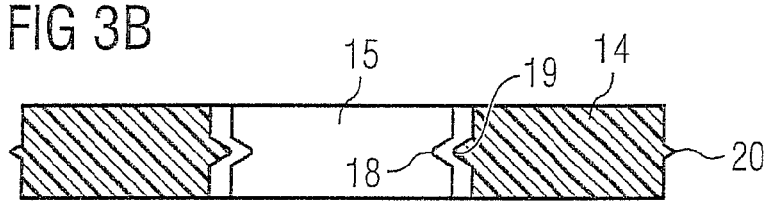
FIG. 3B shows schematically a cross-section of the locking element according to FIG. 3A.

FIG. 3B shows a schematic cross-section through the locking element 14 of this first embodiment. In this view the cutting edges 19 can be seen. In this example of embodiment the engaging hooks 18 are also provided with cutting edges. Here it is also possible to design the cutting edges of the engaging hooks 18 to be narrower than the cutting edges 19.

Figure 3C:
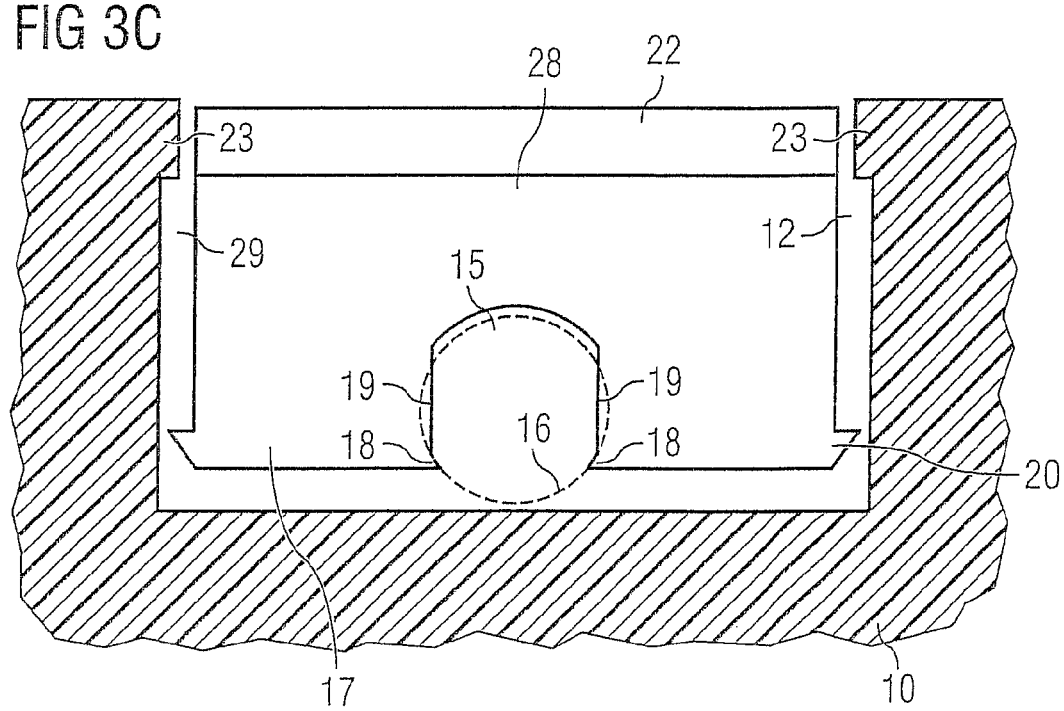
FIG. 3C shows schematically the position of the locking element shown in FIG. 3A in an introduced state.

FIG. 3C shows schematically the position of the locking element 14 in the introduced state, wherein for this representation the inclined orientation of the slot 12 has been omitted in the interests of clarity. Here it can be seen that the external hooks act together with stops 23 on the walls 10 of the MID module 1 and prevent any easy, for example, inadvertent extraction of the locking element 14 from the slot 12.

Figure 4:
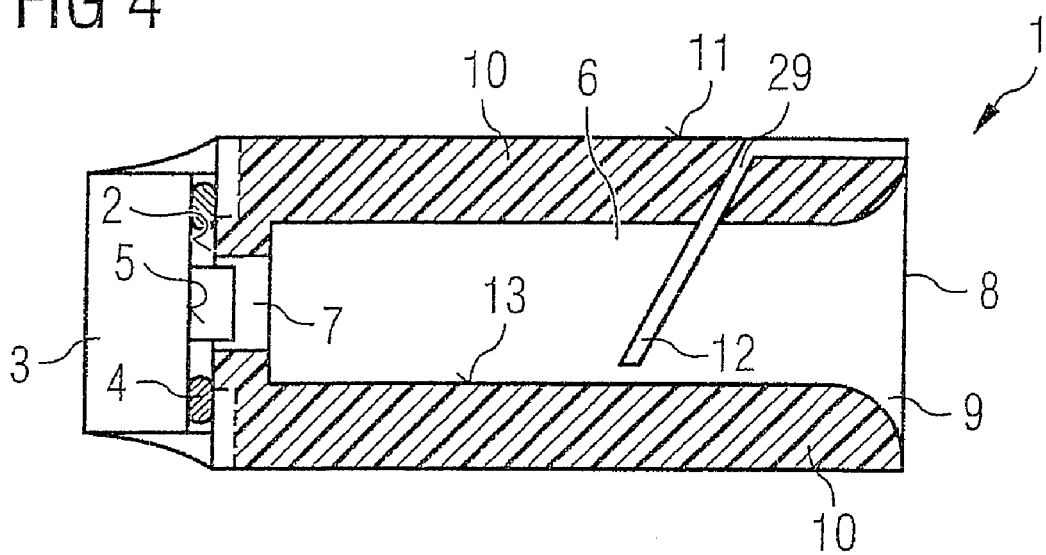
FIG. 4 shows schematically a side view of a cross-section through an MID module according to a second embodiment of the invention.
Figure 5:
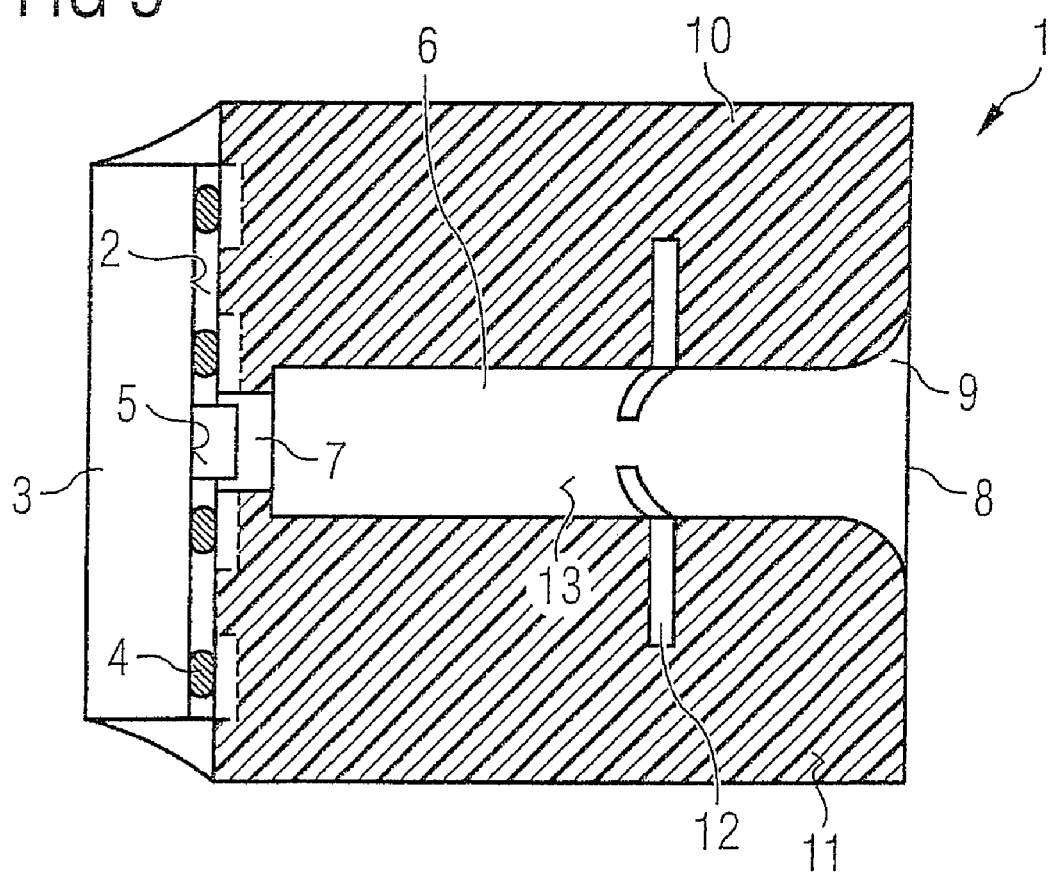
FIG. 5 shows schematically a top view onto a cross-section through the MID module according to FIG. 4.

FIG. 4 shows a second embodiment of the MID module 1, which is identical with the first apart from a narrower slot 12. A top view is again represented in FIG. 5.

Figure 6A:
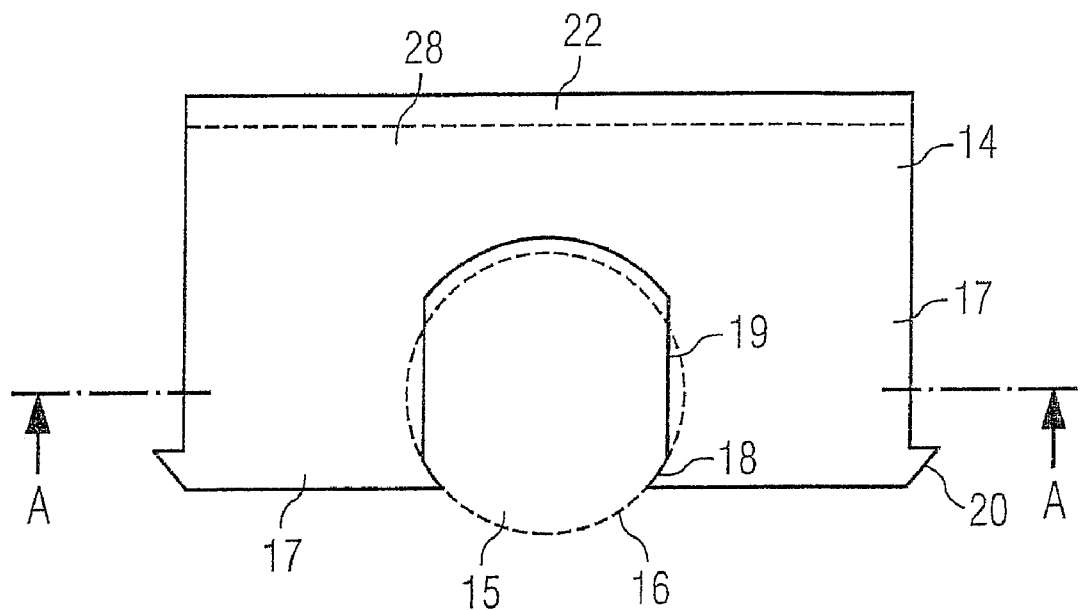
FIG. 6A shows schematically a locking element for the MID module according to the second embodiment.
Figure 6B:
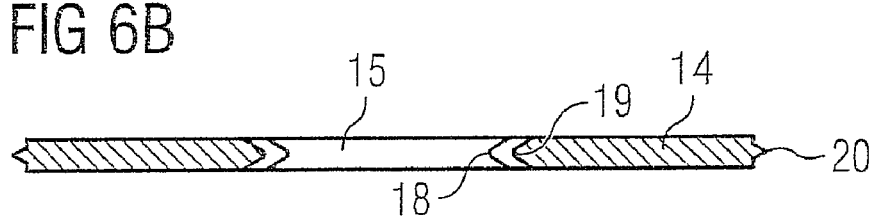
FIG. 6B shows schematically a cross-section of the locking element according to FIG. 6A.

FIG. 6 shows the locking element 14 for this second embodiment. It consists not of plastic, as in the first embodiment, but rather of metal. It has a higher specific strength and can be designed to be thinner.

Figure 7:
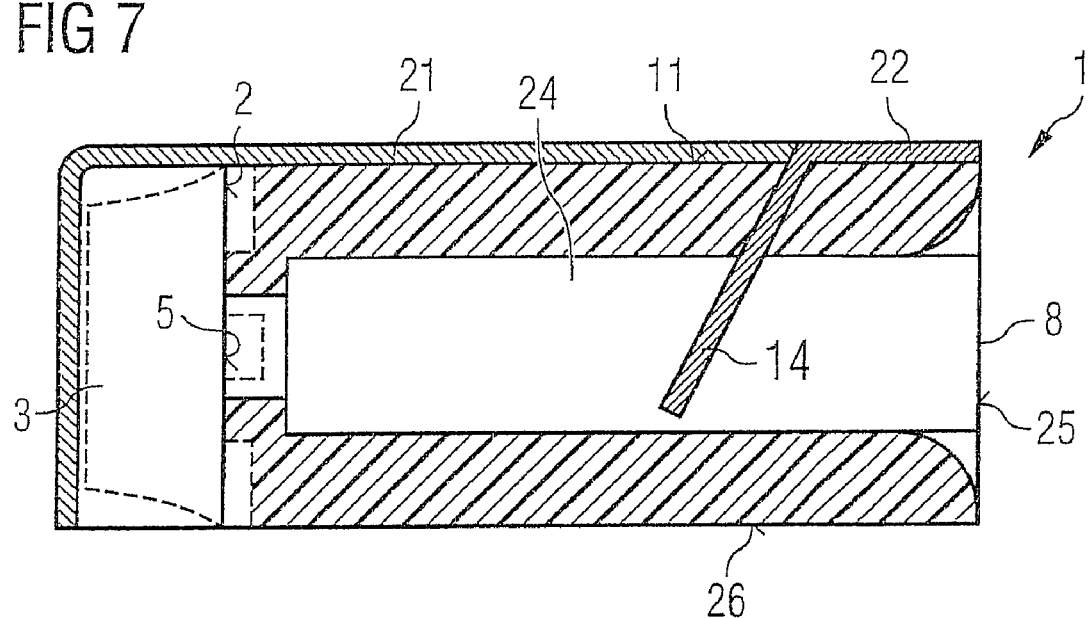
FIG. 7 shows schematically a side view of a cross-section through an MID module according to a third embodiment of the invention.

FIG. 7 shows a third embodiment of the MID module with a fibre 24 installed and a locking element 14 introduced. In this embodiment the locking element 14 also includes a metal cap 21, which in the installed state of the locking element 14 covers essentially the whole of the MID module 1, at least, however, regions of the upper face 11 and the edge faces 27, except for the entry face 25 and the lower face 26. Here the metal cap 21 serves at the same time both as mechanical protection for the MID module 1, and, in particular if it is earthed, as a shielding plate to shield the MID module 1 from electromagnetic radiation. In this third embodiment the bracket 22 merges directly into the metal cap 21 or it is a part of the latter.

Figure 8:
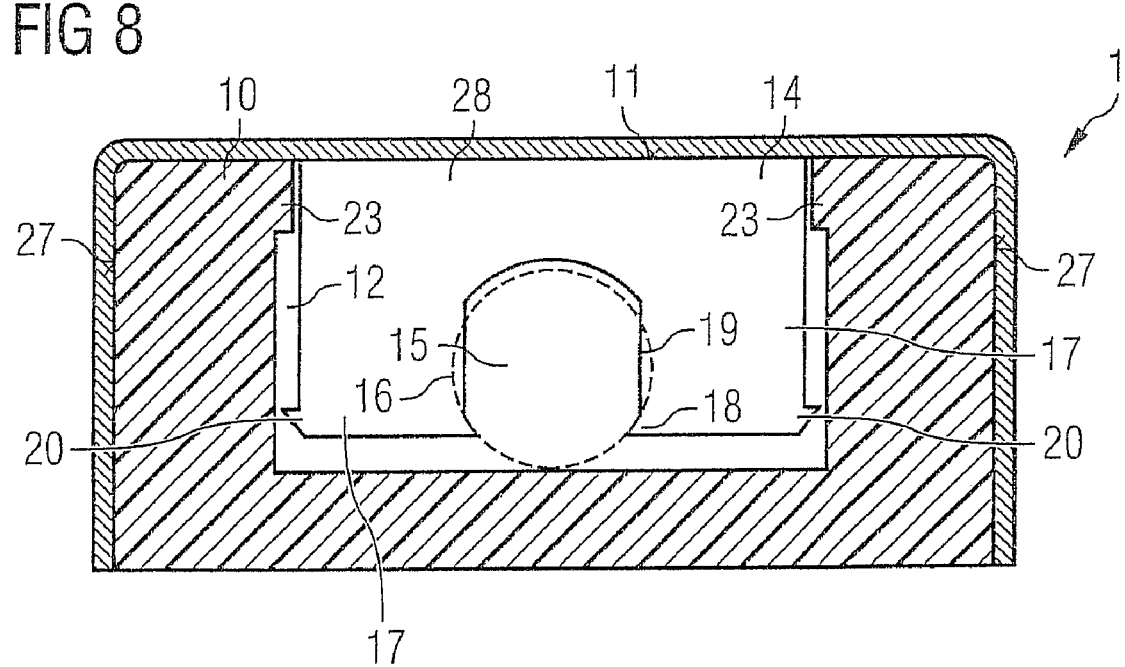
FIG. 8 shows schematically a top view onto a cross-section through the MID module according to FIG. 7.

In the representation in FIG. 8 it can be seen in an analogous manner to FIG. 3C how the introduced locking element 14 is located in the slot 12. Moreover it can be seen in this view that the metal cap 21 covers and encases the upper face 11 and the edge faces 27 of the MID module 1.

In a method of mounting of the optical fibre 24 in the MID module 1 the fibre is introduced into the accommodation channel 6 from an entry face 8 opposite to the front face 2. The locking element 14 is introduced into the slot 12, while locking the locking element 14 in the slot 12, and while clamping the fibre 24 in the opening 15 of the locking element 14.

For the MID module 1 the height of the component is essentially limited only by the relatively small diameter of the fibre 24 itself, the component can thus be designed to be very flat.

LIST OF REFERENCE SIGNS

1 MID module
2 Front face
3 Semiconductor chip
4 Solder ball
5 Optically active region
6 Accommodation channel
7 Window
8 Entry
9 Introduction aid
10 Walls
11 Upper face
12 Slot
13 Channel floor
14 Locking element
15 Opening
16 Dashed line
17 Arm
18 Engaging hook
19 Thicker cutting edge
20 Stop
21 Metal cap
22 Bracket
23 Stop
24 Fibre
25 Entry face
26 Lower face
27 Edge face
28 Cross-link
29 Region above the accommodation channel

The invention claimed is:

1. A moulded interconnect device (MID) kit, comprising:
   a MID module, comprising:
      a module body having an upper face, edge faces, a lower face, and an accommodating channel surrounded by walls for accommodating an optical fibre, the accommodating channel having a diameter corresponding to a diameter of the optical fibre, the module body further having a slot in the walls for accommodating an element to be retained in the slot, wherein the slot forms an angle, $\alpha$, with the front face of the MID module, wherein $\alpha > 90°$; and
      a semiconductor chip arranged on a front face of the accommodating channel, the semiconductor chip comprising an optically active region that is optically accessible from the accommodating channel;
   a locking element separate from the MID module and introducible into the slot and having an opening provided therein for accommodating the fibre, wherein the locking element locks the fibre in the accommodating channel and obliquely engages the slot to urge the optical fibre toward the front face of the accommodating channel.

2. The MID kit of claim 1, wherein the locking element comprises two arms that surround the opening provided in the locking element for accommodating the fibre.

3. The MID kit according to claim 2, wherein each of the arms has an inner face, the inner faces of the arms facing towards the opening and having cutting edges formed thereon that dig into the fibre.

4. The MID kit according to claim 3, wherein the locking element includes a clamp that forms an angle $\alpha$ with the arms, and wherein in an installed state of the locking element, the clamp is aligned to and in parallel with the upper face of the MID module.

5. The MID kit according to 4, wherein the arms of the locking element include engaging hooks, and wherein during installation of the locking element, the hooks engage between the fibre and a floor of the accommodating channel.

6. The MID kit according to claim 5, wherein the engaging hooks comprise cutting edges that dig into the fibre.

7. The MID kit according to claim 1, wherein the locking element includes external hooks and wherein the walls of the accommodating channel includes stops, the external hooks acting together with the stops in the walls of the accommodating channel to lock the locking element in the slot formed in the walls of the accommodating channel.

8. The MID kit according to claim 1, wherein the locking element is embodied in plastic.

9. The MID kit according to claim 1, wherein the locking element is embodied in metal.

10. The MID kit according to claim 9, wherein the locking element includes a metal cap, and wherein in an installed state of the locking element, the metal cap covers the upper face and the edge faces of the MID module.

11. A method for the installing an optical fibre using a moulded interconnect device (MID) module, the MID module having an upper face, edge faces and a lower face, the method comprising:

introducing a fibre into an accommodating channel surrounded by walls for accommodating the fibre, the accommodating channel having a diameter corresponding to a diameter of the fibre, wherein a semiconductor chip is arranged on a front face of the accommodating channel, the semiconductor chip comprising an optically active region that is optically accessible from the accommodating channel, wherein the walls have a slot formed therein at an angle, $\alpha$, with the front face of the accommodating channel, wherein $\alpha > 90°$, and wherein the fibre is introduced into the accommodating channel from an entry face of the MID module lying opposite to the front face of the accommodating channel; and introducing a locking element into a slot in the walls surrounding the accommodating channel and locking the locking element in the slot while clamping an outer surface of the fibre in an opening formed in the locking element, wherein the locking element locks the fibre in the accommodating channel and obliquely engages the slot to urge the optical fibre toward the front face of the accommodating channel.

* * * * *